US011920866B2

(12) United States Patent
Lepez et al.

(10) Patent No.: US 11,920,866 B2
(45) Date of Patent: Mar. 5, 2024

(54) HEAT TREATMENT DEVICE COMPRISING A REFRACTORY ENVELOPE

(71) Applicant: E.T.I.A.—EVALUATION TECHNOLOGIQUE, INGENIERIE ET APPLICATIONS, Compiegne (FR)

(72) Inventors: Olivier Lepez, Lamorlaye (FR); Philippe Sajet, Lacroix Saint-Ouen (FR)

(73) Assignee: E.T.I.A.—EVALUATION TECHNOLOGIQUE, INGENIERIE ET APPLICATIONS, Compiegne (FR)

( * ) Notice: Subject to any disclaimer, the term of this patent is extended or adjusted under 35 U.S.C. 154(b) by 585 days.

(21) Appl. No.: 17/051,988

(22) PCT Filed: Apr. 8, 2019

(86) PCT No.: PCT/EP2019/058815
§ 371 (c)(1),
(2) Date: Oct. 30, 2020

(87) PCT Pub. No.: WO2019/228696
PCT Pub. Date: Dec. 5, 2019

(65) Prior Publication Data
US 2021/0231374 A1 Jul. 29, 2021

(30) Foreign Application Priority Data
Jun. 1, 2018 (FR) ..................................... 18 54773

(51) Int. Cl.
*F27B 9/24* (2006.01)
*F27B 9/06* (2006.01)
(Continued)

(52) U.S. Cl.
CPC ................ *F27D 3/08* (2013.01); *F27B 9/065* (2013.01); *F27B 9/24* (2013.01); *F27D 11/02* (2013.01);
(Continued)

(58) Field of Classification Search
CPC ...... F27B 2009/2484; F27B 9/24; F27B 9/38; F27D 3/08; F27D 2001/047; F26B 17/20; C10B 33/02
See application file for complete search history.

(56) References Cited

U.S. PATENT DOCUMENTS 2,452,249 A * 10/1948 Leiske .................... F26B 17/20
198/664
4,993,943 A * 2/1991 Norris ....................... B09C 1/06
432/107
(Continued)

FOREIGN PATENT DOCUMENTS

CA 2057767 A1 6/1993
DE 102016203584 A1 9/2017
(Continued)

*Primary Examiner* — Gregory A Wilson
(74) *Attorney, Agent, or Firm* — MUNCY, GEISSLER, OLDS & LOWE, P.C.

(57) ABSTRACT

A device for the heat treatment of a product includes a housing, and a conveyor for conveying the product between an inlet of the housing and an outlet of the housing. The conveyor includes a screw which is mounted so as to turn in the housing according to a geometric axis of rotation and comprising an actuator for rotating the screw according to said axis, with ohmic heating of the screw. Accordingly, the housing comprises an envelope consisting of a refractory material through with the screw extends, said envelope being shaped in the form of a tube, the main inner surface of which follows contours of the screw.

12 Claims, 2 Drawing Sheets

Fig. 4

(51) Int. Cl.
*F27D 3/08* (2006.01)
*F27D 11/02* (2006.01)
*F27D 1/04* (2006.01)

(52) U.S. Cl.
CPC ................. *F27B 2009/2484* (2013.01); *F27D 2001/047* (2013.01)

(56) References Cited

U.S. PATENT DOCUMENTS

| | | | | | |
|---|---|---|---|---|---|
| 5,869,810 | A * | 2/1999 | Reynolds | F27D 99/0006 219/427 |
| 10,502,486 | B2 * | 12/2019 | Lepez | B65G 33/265 |
| 10,598,435 | B2 * | 3/2020 | Lepez | F26B 17/20 |
| 2008/0136066 | A1 * | 6/2008 | Taylor | B29C 48/832 425/378.1 |
| 2018/0134963 | A1 | 5/2018 | Lepez et al. | |
| 2021/0332452 | A1 * | 10/2021 | Subramaniam | F27D 3/0024 |

FOREIGN PATENT DOCUMENTS

| | | | | |
|---|---|---|---|---|
| EP | 1846721 B1 * | 5/2011 | C03B 5/237 |
| FR | 2511263 A1 | 2/1983 | |
| FR | 2727744 A1 * | 6/1996 | F23D 1/00 |
| FR | 2924300 A1 * | 5/2009 | C10B 19/00 |
| FR | 2924300 A1 | 5/2009 | |

* cited by examiner

HEAT TREATMENT DEVICE COMPRISING A REFRACTORY ENVELOPE

The present invention relates to a heat treatment device. The present invention also relates to the use of such a device to apply heat treatment to a substance at a temperature higher than 800° C.

BACKGROUND OF THE INVENTION

The heat treatment devices commonly used in industry generally comprise a transfer member and heater means for performing the heat treatment.

A heat treatment device is thus known that includes an enclosure and conveyor means for conveying the substance between the inlet of the enclosure and the outlet of the enclosure, which conveyor means comprise a screw mounted to rotate inside the enclosure about an axis of rotation and means for driving the screw in rotation. The device also includes heater means for heating the screw by the Joule effect.

The substance for treatment is usually inserted into the inlet of the enclosure in the form of divided solids. The screw drives the substance continuously towards the outlet of the enclosure. Because of the temperature of the screw, the substance is heated progressively as it advances, thereby subjecting it to heat treatment.

Nevertheless, such an arrangement does not always make it possible to envisage treatment at high temperatures.

In its patent EP 2 218 300, the present applicant has thus proposed having an enclosure that presents inner walls made of a refractory material, the screw constituting means for heating the inner walls so that said inner walls themselves constitute heater means for radiant heating of the divided solids advancing inside the enclosure.

Such an installation thus promotes radiant heat treatment of divided solids.

Nevertheless, that is still not sufficient to be able to envisage treating a substance at very high temperatures.

OBJECT OF THE INVENTION

An object of the present invention is to design a heat treatment device that is better adapted to treatment at very high temperatures.

Another object of the present invention is to propose the use of such a device.

General Definition of the Invention

In order to achieve this object, there is provided a device for subjecting a substance to heat treatment, the device comprising:

- an enclosure;
- a conveyor for conveying the substance between an inlet of the enclosure and an outlet of the enclosure, the conveyor comprising a screw mounted to rotate inside the enclosure about an axis of rotation and including an actuator for driving the screw in rotation about said axis;

Joule effect heating of the screw.

According to the invention, the enclosure comprises an envelope of refractory material having the screw extending therethrough, said envelope being shaped as a tube having an inner surface following the outlines of the screw.

As a result, the envelope fits closely around the outlines of the screw. Thus, any space between the screw and the envelope is limited, thereby enabling heat exchanges to be increased within the envelope through which the substance is passing.

The invention thus enables the temperature of the substance to be raised very considerably.

Consequently, by means of the invention it is possible to work at high temperatures and even at very high temperatures. The inventors have thus found that it is possible to work at temperatures higher than 800° C., and even higher than 1000° C., and more preferably at temperatures higher than 1300° C., 1500° C., and even 1800° C. (where such a temperature corresponds to the highest temperature recorded in the enclosure; such a temperature is generally to be found at the turn and at the envelope near the outlet of the enclosure).

Naturally, the invention can be used equally well for heat treatment at lower temperatures (and thus at temperatures lower than 800° C.) should that be desired.

Optionally, the envelope is made of refractory ceramic.

Optionally, the envelope is in the shape of a hollow cylinder.

Optionally, an inner radius of the envelope is greater than the outer radius of the screw by a value lying in the range 1 millimeter (mm) to 20 mm.

Optionally, the inner radius of the envelope is greater than the outer radius of the screw by a value lying in the range 5 mm to 15 mm.

Optionally, the envelope is made up of a succession of segments.

Optionally, the various segments are shaped to engage in one another.

Optionally, the enclosure includes an outer casing that encloses the envelope and that is shaped, at least on the inside, to match the shape of the envelope.

Optionally, the casing is shaped as a hollow cylinder.

Optionally, the enclosure includes a blanket made of thermally insulating material surrounding the envelope.

The present invention also relates to the use of such a device to apply heat treatment to a substance at a temperature higher than 800° C.

Optionally, the device is used to apply heat treatment both to a substance and also to the gas that is associated with the substance decomposing at a temperature higher than 800° C.

Other characteristics and advantages of the invention appear more clearly in the light of the following description and the accompanying drawings, relating to a particular embodiment.

BRIEF DESCRIPTION OF THE DRAWINGS

Reference is made to the figures of the accompanying drawings, in which.

DETAILED DESCRIPTION OF A PARTICULAR EMBODIMENT OF THE INVENTION

Figure 1:
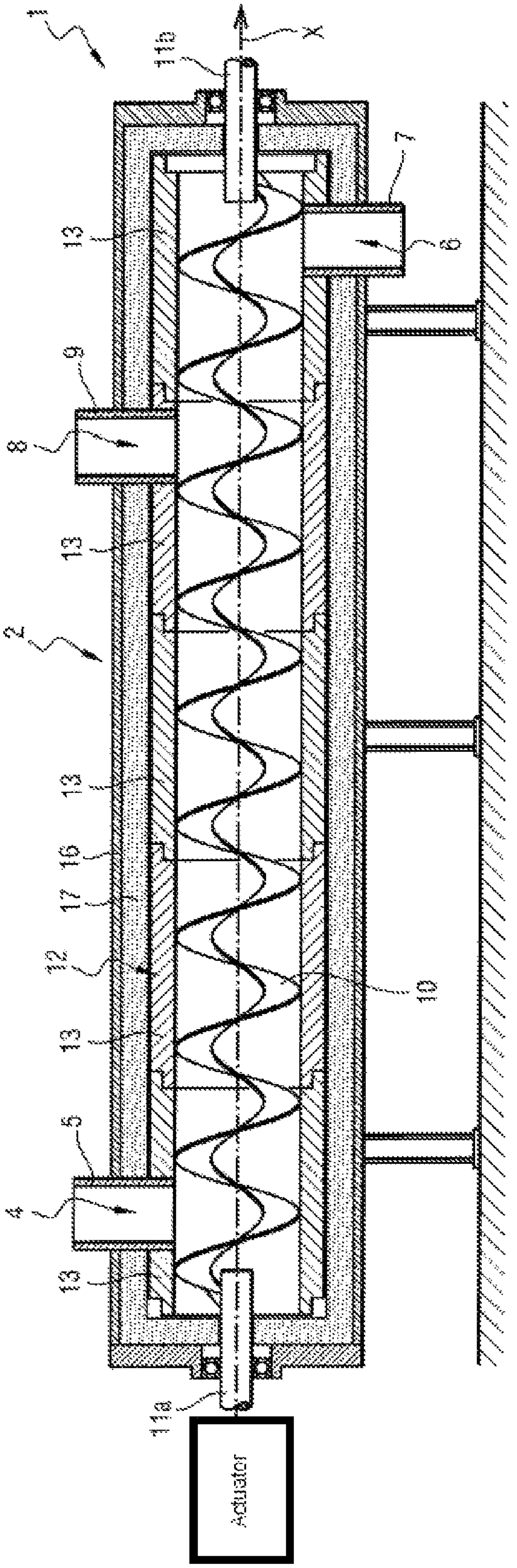
FIG. 1 is a diagrammatic longitudinal section view of a heat treatment device in a particular embodiment of the invention.

FIG. 1 shows a heat treatment device in a particular embodiment of the invention, given overall reference 1.

In this example, the device 1 is applicable to gasifying waste, e.g. vegetable waste or indeed polymer waste, in order to produce a gas, e.g. such as methane gas or indeed dihydrogen. Naturally, this application is not limiting, and the device 1 may be used for numerous other applications. By way of example, mention may be made of roasting, pyrolysis, gasification, devolatilization, desiccation . . . . Likewise, the divided solids may be in the form of powders, granules, pieces, fibers, sheets . . . and they may be of vegetable, mineral, chemical . . . origin.

The device 1 has an enclosure 2 extending generally in an essentially horizontal direction and held above the ground by legs.

In this example, the enclosure 2 has an inlet 4 arranged in the cover of the enclosure 2 substantially at a first longitudinal end of the enclosure 2. In a particular embodiment, the device includes an inlet tube 5 that is connected in sealed manner to the inlet 4 of the enclosure. By way of example, the inlet tube 5 is already connected to a device for grinding, compacting, extruding, melting, or granulating a substance under consideration into divided solids, or indeed a device for pre-conditioning a substance under consideration that is in the form of divided solids. By way of example, a pre-conditioning device serves to heat and dry said substance to specified values of temperature and relative humidity, or else to densify the substance, or else to moisten the substance, or else to extract interstitial air by partial or total melting.

The enclosure 2 also includes a first outlet 6 arranged in this example in the bottom of the enclosure 2 substantially at the second of the two longitudinal ends of the enclosure 2. In a particular embodiment, the device includes an outlet tube 7 that is connected in sealed manner to the first outlet 6 of the enclosure 2. By way of example, the outlet tube 7 is connected to a device for cooling the substance.

In this example, the enclosure 2 also includes a second outlet 8 arranged specifically in the cover of the enclosure 2 substantially at the second of the two longitudinal ends of the enclosure 2, but which could be situated further upstream. This second outlet 8 serves to recover gaseous by-products that may result from the heat treatment of the divided solids. The nature of the gaseous by-products in question depends on the type of treatment in question: it may thus be gas, smoke, steam, heavy metal . . . . In a particular embodiment, the device includes an outlet tube 9 that is connected in sealed manner to the second outlet 8 of the enclosure 2. By way of example, the outlet tube 9 is connected to a device for post-treatment of the gaseous by-products, e.g. in order to purify said gaseous by-products.

Boxes (not shown) are fastened to each of the ends of the enclosure 2.

The device 1 includes a screw 10 of longitudinal axis X that is mounted to rotate about said longitudinal axis X inside the enclosure 2. Specifically, the screw 10 is in the form of a helical coil that is fastened at each of its two ends to the tip of a respective shaft segment 11*a*, 11*b*; however this is naturally merely one example, and any other helical type geometrical configuration could be used.

The screw 10 thus does not itself have a shaft proper.

The other end of each shaft segment 11*a*, 11*b* is connected to a shaft that is on the same axis and that passes through an associated box.

Each box is provided with means serving to drive the screw 10 in rotation, and with means for delivering electricity to the screw 10 so that it constitutes Joule effect heater means. The screw 10 thus constitutes heating transfer means.

For this purpose, the bulk of the material constituting the screw 10 is electrically conductive. The screw 10 is selected to have a melting point that is high, and naturally higher than the temperature at which the device is to be used. It is thus possible to have a screw made of a metal with a melting point higher than 800° C., preferably higher than 1500° C., more preferably higher than 2000° C., still more preferably higher than 2500° C., or even higher than 3000° C. In order to operate at very high temperatures, it is thus possible to have a screw 10 made of a refractory metal or a refractory metal alloy, such as a tantalum-based alloy (with the melting point of the screw 10 then being substantially 3000° C.).

Furthermore, if it is desired to perform heat treatment at high temperatures (typically higher than 800° C.) or at very high temperatures (typically higher than 1500° C.), the boxes need to be arranged and connected to the enclosure 2 in such a manner that the temperature that exists inside said boxes is a temperature that is compatible with the components that they contain, and thus a temperature well below 800° C. For this purpose, the boxes may be provided with thermal lagging and/or with ventilation (e.g. cooling fins, one or more fans, circulating a cooling fluid, . . . ). Preferably, the shaft segments carrying the screw 10 are hollow so that a cooling fluid can circulate inside the shaft segments.

For further details, reference may be made to above-mentioned Document EP 2 218 300 in the name of the applicant, in which the driving and the heating of the screw 10 and also the cooling of the boxes and of the shaft segments are described more fully.

In accordance with the invention, the enclosure comprises an envelope 12 made of refractory material through which the screw 10 extends. In addition to its functions of directly heating substances that come into contact therewith and of transferring said substances longitudinally, the screw 10 also heats the envelope 12 that thus itself provides radiant heating to the mass of divided solids.

Because the bulk of the screw 10 is constituted by an electrically conductive material, and is connected to at least one supply of electricity, provision must be made for the envelope 12 to be made of a material that is both refractory and also electrically insulating. By way of example, it may be made of a refractory concrete or of a refractory ceramic material such as those commonly used for making furnace walls. Such materials have melting points that are very high and in particular higher than 2000° C. By way of example, the envelope 12 may be based on alumina ($Al_2O_3$). Clearly, the envelope 12 is selected to have a melting point that is high, and naturally higher than the temperature at which the device is to be used.

In the present example, the tubes 5, 7, and 9 are preferably likewise made of refractory material of the same kind as the material of the envelope 12.

With reference to the various figures, the envelope 12 is in the shape of a longitudinally-extending tube through which the screw 10 is arranged. The tubular envelope 12 thus surrounds the screw 10 circumferentially.

In this example, the screw 10 also rests on the bottom of the envelope 12.

The envelope 12 is thus in the shape of a hollow cylinder. The cross-section of the envelope 12 matches the outlines of the screw 10. The cross-section of the envelope 12 is thus in the shape of an annulus having its internal circle surrounding the screw 10.

As a result, any gap between the screw 10 and the surrounding envelope 12 is limited.

This thus forces the gas that is produced by partial or total thermal decomposition of the substance to pass to the center of the screw 10 and into the corresponding helical space defining by the turns where the temperature is the highest, thereby enabling the gas that has come from the substance to be heat treated at temperatures that are very high, as is the solid phase of the substance. The gas is also forced, from the beginning, to pass via the center of the screw 10 and the helical space, thereby maximizing the transit time of the gas at the center of the screw 10 while it is passing through the enclosure.

In order to escape from the envelope, the gas must thus run along the space that is left between the heating turns of the screw 10 because of the very narrow proximity between the screw 10 and the envelope 12. It is this distance travelled in the core of the screw that finishes off the heat treatment of the gas.

This serves to limit the proportion of gas that goes into a top plenum of the envelope 12, with the consequence of lengthening the duration for which said gas is subjected to heat treatment.

The envelope 12 is thus shaped to be as close a fit as possible to the diameter of the screw 10. Preferably, the inner radius of the envelope 12 is identical to the outside radius of the 10. Under such circumstances, the screw 10 also touches the remainder of the envelope 12 (and not only the bottom of the envelope). The screw 10 and the envelope 12 are thus concentric.

For reasons of ease of assembly, it may be preferable for the radius of the envelope 12 to be slightly greater than the radius of the screw. Under such circumstances, with the screw resting on the bottom of the envelope 12, the screw 10 and the envelope 12 are not concentric, but slightly off axis. A plenum thus exists in the top portion of the envelope 12. Preferably, the envelope 12 is shaped in such a manner that this plenum occupies 1 mm to 20 mm, preferably 5 mm to 15 mm, more preferably 5 mm to 10 mm.

Under all circumstances, the envelope 12 is shaped to be a genuine sheath for the screw 10, not only matching the shape of the screw 10, but also being close to the screw 10.

Naturally, the envelope 12 surrounds the screw 10 over 360°. Furthermore, the envelope 12 extends at least along the entire length of the screw 10.

Preferably, the envelope 12 extends along the entire length of the enclosure 2.

By way of example, the envelope 12 may be made by molding.

Figure 4:
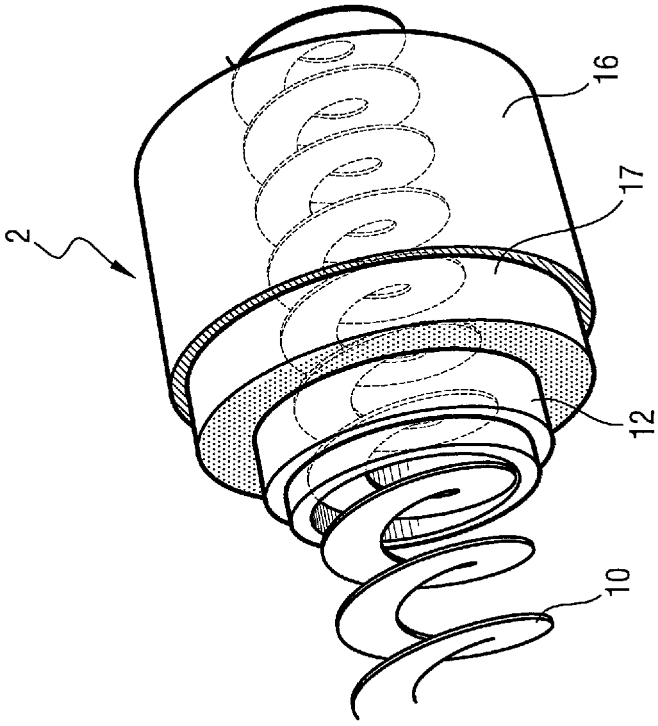
FIG. 4 is a cross-section view of a portion of the device shown in FIG. 1.
Figure 2:
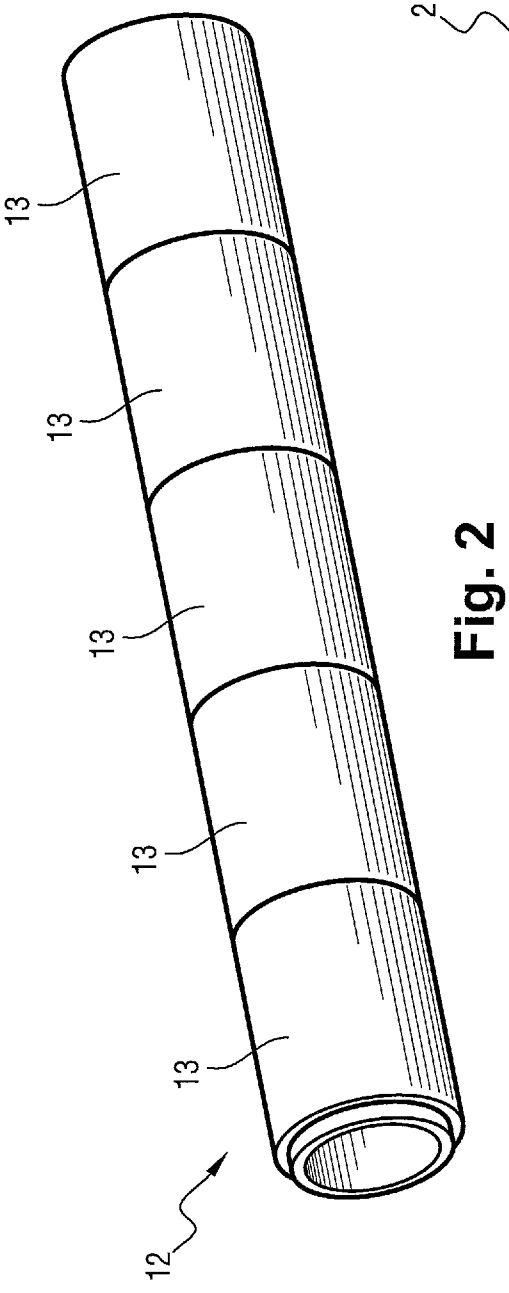
FIG. 2 is a perspective view of the envelope of the device shown in FIG. 1.
Figure 3:
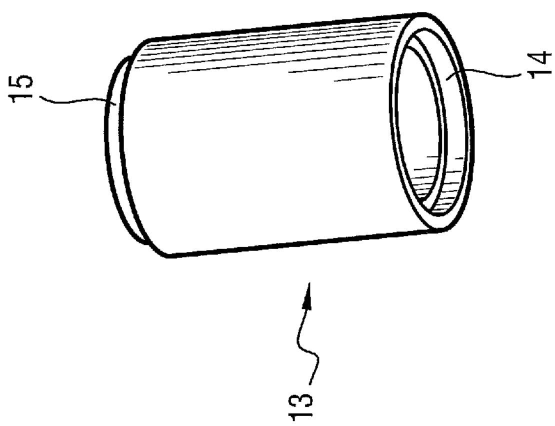
FIG. 3 is a perspective view of a segment of the envelope shown in FIG. 2.

As can be seen more clearly in FIGS. 3 and 4, in this example the envelope 12 is not made as a single piece. The envelope 12 is thus made up of a succession of segments 13.

This serves in particular to make it easier to arrange the screw 10 inside the envelope 12. Also, in the event of one of the segments 13 being damaged, this makes it possible to change only a fraction of the envelope 12.

This also makes the envelope 12 easier to fabricate. In particular, each segment 13 may be fabricated by molding.

Preferably, the various segments 13 are all identical to one another.

The envelope 12 typically comprises three to seven segments.

Preferably, the various segments 13 are connected together by screw fastening, by adhesive, by snap fastening, by mutual engagement, by sealing.

Preferably, the various segments 13 are shaped so as to be capable of being mutually engaged one after another.

This provides good continuity for the envelope 12. This serves in particular to provide good leak-tightness for the envelope 12, which is particularly advantageous for keeping gaseous by-products inside the envelope 12.

Furthermore, the mutual engagement of the various segments 13 enables the various segments 13 to be automatically centered relative to one another, thereby facilitating assembly of the envelope 12.

In this example, each segment 13 is in the form of a cylindrical tube, a first end of the segment 13 presenting a circular inner groove 14 and a second end of the segment 13 (opposite from the first end) presenting a circular extension 15 suitable for being inserted in the circular inner groove 14 of the adjacent segment 13.

This provides stepped engagement between the various segments 13, thus providing good leak-tightness overall.

Provision may be made to fasten the various segments 13 to one another once they have been mutually engaged (e.g. by ceramic sealing).

As can be seen more clearly in FIG. 4, in a particular embodiment, the enclosure 2 has an outer casing 16 that encloses the envelope 12 and the screw 10 and that is preferably shaped to match the shape of the envelope 12 and thus of the screw 10.

The casing 16 is thus shaped as a longitudinally-extending tube through which the envelope 12 is engaged, with the tube being closed by two end walls. The shaft segments 11*a*, 11*b* carrying the screw 10 pass through said end walls.

The casing 16 thus surrounds the envelope 12 circumferentially. Naturally, the casing 16 surrounds the screw 12 over 360°.

The casing 16 is thus concentric with the envelope 12.

The cross-section of the casing 16 follows the outlines of the envelope 12. The cross-section of the casing 16 is thus in the shape of an annulus having its internal circle surrounding the envelope 12.

As a result, any space between the casing 16 and the envelope 12 is limited.

In this example, the casing 16 comprises a single piece.

The casing 16 is in the shape of a hollow cylinder.

The casing 16 is made of metal material. Typically, the casing 16 is made of steel, such as stainless steel, and for example it is non-magnetic.

In a preferred embodiment, the casing 16 and the envelope 12 are not in contact with each other.

Thus, the enclosure 2 includes an intermediate blanket 17 made of thermally insulating material extending between the envelope 12 and the casing 16. By way of example, the blanket 17 is made of rock wool.

In this example, the blanket 17 is arranged in such a manner that the outer surface of the envelope 12 is in contact with the inner surface of the blanket 17, and the inner surface of the casing 16 is in contact with the outer surface of the blanket 17.

Thus, the blanket 17 likewise matches the shape of the enclosure 2 and of the envelope 12.

The blanket 17 is thus in the shape of a longitudinally-extending tube through which the envelope 12 is engaged, the blanket 17 itself extending through the casing 16 and having two end walls closing the tube. Said end walls are the walls against which the two ends of the envelope 12 bear and also the walls having the shaft segments 11*a*, 11*b* carrying the screw 10 passing therethrough. Said end walls themselves press against the corresponding end walls of the casing 16. The blanket 17 thus extends over the entire length of the casing 16 so as to bear at both ends against the end walls of the casing 16.

The blanket 17 thus surrounds the envelope 12 circumferentially. Naturally, the blanket 17 surrounds the envelope 12 over 360°.

The blanket 17 is thus concentric with the envelope 12.

The cross-section of the blanket 17 follows the outlines of the casing 16 and of the envelope 12. The cross-section of the blanket 17 is thus in the shape of an annulus having its inner circle surrounding the envelope 12 and its outer circle surrounded by the casing 16.

The blanket 17 is in the shape of a hollow cylinder.

In this example, the blanket 17 is a single piece.

As a result of its generally tubular shape with layers (casing, blanket, envelope, screw) that are very close together, or indeed in contact concerning the casing 16 and the blanket 17 and concerning the blanket 17 and the envelope 12, the enclosure 2 is of small dimensions.

It is thus possible to make a high temperature or even a very high temperature heat treatment device 1 that is simultaneously simple, versatile, and compact, and that also consumes little energy, while being capable of performing a wide variety of treatments.

The invention is not limited to the embodiments described above, and on the contrary the invention covers any variant using equivalent means to reproduce the essential characteristics set out above.

In particular, it is possible for only the envelope to match the shape of the screw. The casing of the enclosure could thus present some other shape. It would also be possible to have a casing in which only the inner surface matches the shape of the envelope, while its outer surface is different. The casing and the blanket and/or the blanket and the envelope need not be in contact over the entire length of the casing, of the blanket, and/or of the envelope.

The blanket need not be a single piece, but could be made up of a plurality of elements that are fastened to one another and/or fastened to the envelope and/or fastened to the casing. It is possible to do without a blanket.

Likewise, the casing need not be a single piece.

The envelope could be a single piece. It is possible for only the inner surface of the envelope to match the shape of the screw, with its outer surface presenting some other shape. The envelope could thus be a tube, i.e. an elongate hollow member of outline that is not cylindrical.

The envelope and the screw could be concentric even if the inner radius of the envelope is greater than the inner radius of the screw, in which case the screw would not rest on the bottom of the envelope. Although in this example the substance is inserted into the enclosure in the form of divided solids, the substance could be inserted in some other form, e.g. as a liquid or indeed a gas. In the same manner, it is possible to recover one or more substances at the outlet in the form of a gas, a liquid, an oil, a solid . . . . The number of inlets and outlets of the enclosure should be adjusted accordingly.

Among the possible applications of the invention, it should also be observed that the heat treatment device could be installed downstream from a conventional pyrolysis installation so as to treat the char coming from the pyrolysis in order to be subjected to post-treatment.

The invention claimed is:

1. A device for subjecting a substance to heat treatment, the device comprising:

an enclosure;

a conveyor for conveying the substance between an inlet of the enclosure and an outlet of the enclosure, the conveyor comprising a screw mounted to rotate inside the enclosure about an axis of rotation and including an actuator for driving the screw in rotation about said axis, the screw itself not having a rotary shaft;

Joule effect heating of the screw;

wherein the enclosure comprises an envelope of refractory material having the screw extending therethrough, said envelope being shaped as a tube having a main inner surface following the outlines of the screw.

2. The device according to claim 1, wherein the envelope is made of refractory ceramic.

3. The device according to claim 1, wherein the envelope is in the shape of a hollow cylinder.

4. The device according to claim 1, wherein an inner radius of the envelope is greater than the outer radius of the screw by a value lying in the range 1 mm to 20 mm.

5. The device according to claim 4, wherein the inner radius of the envelope is greater than the outer radius of the screw by a value lying in the range 5 mm to 15 mm.

6. The device according to claim 1, wherein the envelope is made up of a succession of segments.

7. The device according to claim 6, wherein the various segments are shaped to engage in one another.

8. The device according to claim 1, wherein the enclosure includes an outer casing that encloses the envelope and that is shaped, at least on the inside, to match the shape of the envelope.

9. The device according to claim 8, wherein the casing is shaped as a hollow cylinder.

10. The device according to claim 1, wherein the enclosure includes a blanket made of thermally insulating material surrounding the envelope.

11. A use of the device according to claim 1, for heat treatment of a substance at a temperature higher than 800° C.

12. The use according to claim 11, wherein the device is used to apply heat treatment both to a substance and also to gas that is associated with the substance decomposing at a temperature higher than 800° C.

* * * * *